UNITED STATES PATENT OFFICE 1,949,425

CATALYTIC DEHYDROGENATION PROCESS FOR PRODUCING ESTERS

Wilbur Arthur Lazier, Marshallton, Del., assignor to E. I. du Pont de Nemours & Company, Wilmington, Del., a corporation of Delaware No Drawing. Application July 3, 1931, Serial No. 548,705

18 Claims. (Cl. 260—106)

This invention relates to catalytic dehydrogenation processes, and more particularly to the production of ester-containing solvents by dehydrogenation of polyhydric alcohols. In a specific embodiment, it relates to the catalytic dehydrogenation of glycerol under such conditions that ester-like compounds representing a major portion of the reaction products are obtained.

This invention has as an object the manufacture of esters and ester-containing mixtures, suitable for use as solvents or for other purposes, by catalytic dehydrogenation of polyhydric alcohols, preferably under pressure. A further object is the treatment of glycerol and glycols in such a way as to form the corresponding esters.

For a long time it has been known that the dehydrogenation of simple primary aliphatic alcohols leads to the formation of small amounts of esters, in addition to aldehydes which are the main products. It has now been found that the same general rule applies to the dehydrogenation of the polyhydric alcohols. The dehydrogenation of glycerol, for example, leads not only to the formation of glyceric aldehyde, but when carried out under suitable reaction conditions leads to the formation of an ester which has not been wholly and completely identified but which for the purposes of this description may be regarded as glycerol glycerate or a polymeric compound of the same. With these polyhydric alcohols, dehydrogenation at ordinary pressure may lead to a higher yield of esters than is the case with simple alcohols.

Glycerol, for example, when passed over a catalyst consisting substantially of a dehydrogenating oxide, yields a product containing appreciable quantities of esters. The ester yield, however, may be greatly increased with substantial suppression of aldehyde formation by carrying out the dehydrogenation at elevated pressures, in spite of the fact that elevated pressure would be expected to be deleterious due to an increase in volume which accompanies the reaction.

The following examples show how the invention may be carried out in practice:

Example 1

A suitable dehydrogenation catalyst was prepared by precipitating chromates from a mixed solution containing 82.5 mol. per cent of zinc sulfate, 10.0 mol. per cent copper sulfate, and 7.5 mol. per cent cadmium nitrate, with a chemically equivalent amount of ammonium chromate solution freshly prepared from chromic acid and ammonia. The multiple chromates containing ammonium chromate were washed, dried, and ignited at 400° C. to form a black powder consisting of a mixture of the various metal chromites and oxides. This chromite material was briquetted, crushed, and screened to 8–14 mesh material.

Fifty cc. of the above described catalyst was placed in a 1-inch glass tube-furnace and heated to 330° C. At this temperature glycerol vapor was passed thru the apparatus at atmospheric pressure and at the rate of about 100 cc. of liquid glycerol per hour. The products consisted of 4.5 liters of gas per hour containing about 35% carbon dioxide and about 62% hydrogen, and a liquid product amounting in weight to 89% of the glycerol passed over the catalyst. The liquid condensate was separated by distillation into one portion boiling below 100° C. and another portion boiling at 100° C. and higher. Extensive analyses were made on each of the two liquid samples. In presenting the data, the esters in the low boiling material have been calculated as ethyl acetate, which was found to be present in small amounts, and those in the high boiling material as the theoretical glyceryl glycerate. The small amount of acid present was assumed to be glyceric acid. The aldehydes contained in the low boiling portion were calculated as acetaldehyde and those in the high boiling material as glyceric aldehyde. Detailed analyses of the liquid products are given below:

|  | Percent |
|---|---|
| Low boiling esters calculated as ethyl acetate | 11.0 |
| Low boiling aldehydes calculated as acetaldehyde | 4.3 |
| High boiling esters calculated as glyceryl glycerate | 32.0 |
| High boiling aldehydes calculated as glyceric aldehyde | 22.5 |
| High boiling acids calculated as glyceric acid | 1.9 |

Ketones were also found to be present in small quantities.

The above data show that high boiling esters are a major product of the dehydrogenation. The aldehyde-ester ratio is somewhat high, and may be greatly improved upon by the use of pressure as illustrated in the next example.

Example 2

In this experiment the dehydrogenation of glycerol was carried out at an elevated pressure. Twenty-five cc. of the dehydrogenation catalyst described in Example 1 was loaded into a high pressure tube of the type commonly used for methanol synthesis and heated to 350° C. Glycerol was then pumped over the catalyst at the rate of 250 cc. per hour, the pressure on the system being maintained at 3,000 lbs. per sq. in. (absolute). In a period of 12 hours, a total of 2,700 cc. of glycerol was passed thru the system, while a total of 2,936 cc. of liquid products was recovered. In order to maintain the pressure constant, it was necessary to draw out of the system continuously a portion of the gaseous reaction products totaling about 50 liters and consisting for the most part of hydrogen. The liquid condensate contained a very small amount of tarry material which floated on top of the main portion. The viscosity of the product was considerably lower than that of the glycerol treated. The apparent increase in volume is due to a marked lowering of the specific gravity of the material on passage over the catalyst. Extensive analyses were carried out and calculated as indicated in Example 1 to determine the character of the liquid product, the results of which are tabulated as follows:

|  | Per cent |
|---|---|
| Aldehydes calculated as glyceric aldehyde | 1.8 |
| Acids calculated as glyceric acid | 5.3 |
| Esters calculated as glyceryl glycerate | 39.0 |
| Ketones calculated as acetone | 3.6 |

The iodine number of the product was 13.3, and the specific gravity 1.18.

It is apparent from these figures that the application of pressure to the reaction results in a much diminished yield of aldehyde with a somewhat higher yield of ester. The dehydrogenated product was soluble in water.

The small amount of unsaturation present in the product may be removed by a subsequent hydrogenation treatment, which does not destroy the ester and leads to an improvement in odor and other qualites.

*Example 3*

The same catalyst described in Example 1 was also used for the high pressure dehydrogenation of the monoethyl ether of ethylene glycol, commonly known under the trade-mark "Cellosolve". Twenty-five cc. of catalyst was loaded into a high-pressure resisting tube and heated to 407° C. The mono-ether of ethylene glycol was then pumped over the catalyst at a pressure of 3000 lbs. per sq. in. (absolute). In the course of four hours there was passed thru the system 1605 cc. of liquid, while 1480 cc. of liquid products were recovered, together with 145 liters of gas. Analysis showed the liquid product to contain the following components:

|  | Per cent |
|---|---|
| Aldehyde calculated as acetaldehyde | 0.5 |
| Acid calculated as acetic acid | 0.7 |
| Esters calculated as "Cellosolve" esters | 21.0 |

That the esters were high boiling compounds was demonstrated by the fact that after distillation the liquid material boiling above 140° contained 89% esters calculated as the hypothetical "Cellosolve" cellosolvate.

The effect of high pressure in suppressing the formation of aldehydes is clearly demonstrated in this example.

*Example 4*

Using a zinc copper cadmium chromite catalyst prepared as described in Example 1, ethylene glycol was subjected to dehydrogenation at high pressure. 6.7 liters of the glycol were pumped over 25 cc. of the catalyst at 375° C. and 3000 lbs. per sq. in. (absolute) pressure during the course of 16 hours. Gas production amounted to 2600 liters, and 5.6 liters of liquid products were obtained. The gas was principally hydrogen but contained in addition 4% CO, 31% $CO_2$, and 11% ethylene. Analysis of the liquid product gave the following results:

|  | Per cent |
|---|---|
| Aldehyde calculated as acetaldehyde | 7.0 |
| Esters calculated as glycol glycollate | 27.5 |
| Acids calculated as glycollic acid | 4.9 |
| Ketones calculated as acetone | 2.8 |

On distillation, the condensate was found to contain considerable ethanol and water, but the residue boiling above 100° C. was found to contain 50% esters calculated as glycol glycollate, showing that a large part of the ester was of the high boiling variety.

The invention is applicable to any dihydric or polyhydric alcohol containing a primary alcohol group. It is also applicable to a monoether of a dihydric alcohol or to a monoether or polyether of a polyhydric alcohol provided the partially etherified polyhydric alcohol contains a free primary alcohol group.

In the above examples, only the dehydrogenation of a few common compounds has been described, but the process is also applicable to the sugar alcohols such as sorbitol, erythritol, xylitol, etc., and their ethers. It may be applied with success to various glycols such as trimethylene glycol, 1,2-propylene glycol, or the various butylene glycols. "Cellosolve" acetate may be converted into a higher boiling ester and mono- and diethylin may be converted into an ester containing solvent. The term "polyhydric alcohol" as used in the claims is intended to include within its scope these various compounds to which the invention is described as applicable. This term therefore covers all alcohols having more than one oxygen atom linked singly to carbon atoms, i. e., polyhydric alcohols, and polyhydric alcohols one or more of the hydroxyl hydrogen atoms of which are displaced by substituent groups such as ester and ether groups.

As has been pointed out, the use of pressure, though greatly enhancing the yield of ester, is not always necessary. A considerable portion of esters, for example, is obtained from glycerol and other polyhydric alcohols at ordinary pressure. It is highly preferable, however, to use pressures up to or higher than 3000 lbs. per sq. in. with an accompanying high increase in ester yields and in the rate of ester production, and with a concomitant decrease in the yield of aldehydes. The higher the pressure used, the smaller will be the aldehyde ester ratio for the reaction products. Where it is desired to form reaction products substantially free from aldehydes, high pressure must be used. The advantages of using pressure in carrying out the reaction could not have been predicted, particularly in view of the fact that the reaction is accompanied in many cases by an increase in volume of the normally liquid reaction products over the volume of the starting material to which must be added the effect of a high yield of inert gaseous reaction products by scission of the molecules of polyhydric alcohol being acted upon.

The temperatures used are those ordinarily suitable for dehydrogenation of simple alcohols.

In the examples given, temperatures between 330° C. and 407° C. were used, but I do not wish to limit myself to these. In carrying out the dehydrogenation of "Cellosolve" under pressure, it was found that the conversion to esters rose sharply as the temperature was increased from 360° C. to 410° C. The upper limiting temperature, of course, is that at which excessive decomposition of the alcohol takes place. The operable limits of temperature may be considered as varying between about 250° C. and 500° C., the particular temperature used depending upon the pressure, specific catalyst, specific material acted upon, rate of flow, etc. Optimum temperatures may be determined by simple experiment in the light of the description of the invention given herein.

The usual dehydrogenation catalysts may be used, such as silver, copper, or copper oxide, zinc oxide, or manganese oxide, with or without promoters. The latter two oxides are recognized in the art as being members of the group known as difficultly reducible oxides. The best results are, however, obtained by use of heavy metal chromite catalysts, whether simple or mixed chromites, and particularly by the use of the chromite catalysts described in my U. S. Patent Nos. 1,746,782 and 1,746,783 and in my co-pending specification Ser. No. 470,238, filed July 23, 1930, the general preparation of which is illustrated in Example 1. These chromites are likewise recognized in the art as compositions wherein the oxides are difficultly reducible.

As will be seen from reference to my said U. S. patents and pending application, these catalysts are prepared by precipitating either single or mixed simple heavy metal chromates from a solution of a soluble chromate, or by precipitating single or mixed double heavy metal chromates from a solution of an ammonium or substituted ammonium chromate followed by ignition of the freshly precipitated chromates at a temperature sufficiently elevated to effect the formation of the corresponding chromites. The ignition temperature in the case of the simple chromates is about 600° C. and above, and in the case of the double chromates about 400° C. and above.

Rates of flow for obtaining practical conversions will vary widely, depending on the temperature, pressure and activity of the catalyst. Optimum rates of flow for any given catalyst or polyhydric alcohol may be determined by experiment in view of the above detailed description of the invention. The order of magnitude of the rate of flow is indicated in the examples, but I do not wish to be limited to the specific rates given therein. For some materials the process may even be carried out as a batch process as in an autoclave, with or without stirring, although a flow process is preferred.

The methods described are especially useful for converting a non-ester solvent or plasticizer into an ester-containing solvent or plasticizer. In certain industrial arts it is desirable to have high boiling esters which are also soluble in water. Such may now be prepared with facility by the present process. Separation of the individual esters in a pure state is difficult, owing to the tendency towards the formation of chain compounds thru ester condensation, but in certain cases it is possible to concentrate the ester component thru the use of suitable solvents. In their many possible applications, the pure esters may be concentrated and removed from the excess alcohols, or the mixture may be used as it is obtained after a single pass over the catalyst.

A third possibility is the further treatment of the product with chemical reagents such as those which produce acetylation or the introduction of ether groups.

The products of this invention are valuable as solvents, softeners, wetting agents, and the like.

The above description and specific examples are to be taken as illustrative only and not as limiting the scope of the invention. Any departure therefrom which conforms to the spirit of the invention is intended to be included within the scope of the claims.

I claim:

1. In the process of forming esters by the catalytic dehydrogenation of polyhydric alcohols the step which comprises contacting an aliphatic polyhydric alcohol with a catalyst comprising essentially a difficultly reducible dehydrogenating metal oxide under a pressure substantially above atmospheric pressure and at a temperature at which dehydrogenation of the alcohol takes place.

2. In the process of forming esters by the catalytic dehydrogenation of polyhydric alcohols, the step which comprises contacting an aliphatic polyhydric alcohol with a dehydrogenation catalyst under a pressure substantially above atmospheric and at a temperature at which dehydrogenation of the alcohol takes place.

3. The process described in claim 2 in which the catalyst is a heavy metal chromite.

4. The process described in claim 2 in which the catalyst is a heavy metal chromite prepared by igniting a heavy metal chromate.

5. The process described in claim 2 in which the catalyst is a heavy metal chromite prepared by igniting a freshly precipitated heavy metal chromate.

6. The process described in claim 1, characterized in that the polyhydric alcohol is maintained in the vapor phase.

7. In the process of forming esters by the catalytic dehydrogenation of polyhydric alcohols, the step which comprises contacting an aliphatic polyhydric alcohol in the liquid phase with a dehydrogenation catalyst under superatmospheric pressure and at a temperature at which dehydrogenation of the alcohol takes place.

8. The process described in claim 1, characterized in that the reaction temperature is 250–500° C.

9. In the process of forming esters by the catalytic dehydrogenation of polyhydric alcohols, the steps which comprise contacting an aliphatic polyhydric alcohol with a dehydrogenation catalyst at a temperature of 250°–500° C. and under a pressure substantially above atmospheric.

10. In the process of forming esters by the catalytic dehydrogenation of polyhydric alcohols, the steps which comprise contacting an aliphatic polyhydric alcohol with a dehydrogenation catalyst at a temperature of 250°–500° C. and under a pressure ranging from substantially above atmospheric up to 3000 lbs. per sq. in. absolute.

11. The process described in claim 1 in which the catalyst is a heavy metal chromite.

12. The process described in claim 1, characterized in that the temperature is maintained at 250–500° C. and the polyhydric alcohol is glycerol.

13. In the process of forming esters by the catalytic dehydrogenation of glycerol, the steps which comprise contacting glycerol with a dehydrogenation catalyst at a temperature of 250°–500° C. and under a pressure substantially above atmospheric.

14. In the process of forming esters by the catalytic dehydrogenation of glycerol, the steps which comprise contacting glycerol with a dehydrogenation catalyst at a temperature of 250°–500° C. and under a pressure ranging from substantially above atmospheric up to 3000 lbs. per sq. in. absolute.

15. The process of forming esters which comprises contacting glycerol with a catalyst containing essentially a heavy metal chromite, at a temperature at which dehydrogenation of the glycerol takes place, withdrawing the reaction products, and separating the formed esters therefrom.

16. The process of forming esters which comprises contacting glycerol with a catalyst containing essentially a heavy metal chromite, at a temperature at which dehydrogenation of the glycerol takes place and under superatmospheric pressure, withdrawing the reaction products, and separating the formed esters therefrom.

17. The process of forming esters which comprises contacting a glycol with a catalyst containing essentially a heavy metal chromite, at a temperature at which dehydrogenation of the glycol takes place and under superatmospheric pressure, withdrawing the reaction products, and separating the formed esters therefrom.

18. The process of forming esters which comprises contacting an etherified aliphatic polyhydric alcohol containing at least one free hydroxy group with a catalyst containing essentially a heavy metal chromite, at a temperature at which dehydrogenation of the etherified polyhydric alcohol takes place, and under superatmospheric pressure, withdrawing the reaction products, and separating the formed esters therefrom.

WILBUR A. LAZIER.